L. I. REICHNER.
LIQUID MIXER, SHAKER, AND JUICE EXTRACTOR.
APPLICATION FILED MAY 31, 1913.
1,075,119. Patented Oct. 7, 1913.
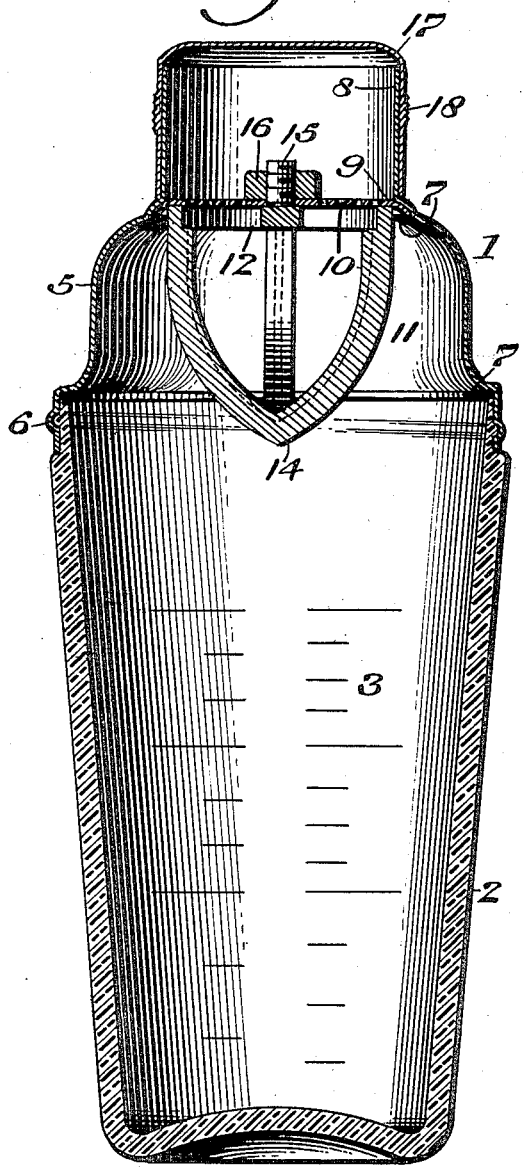
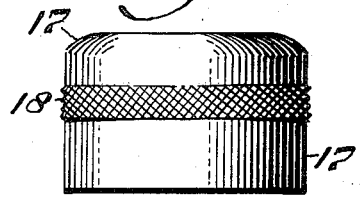
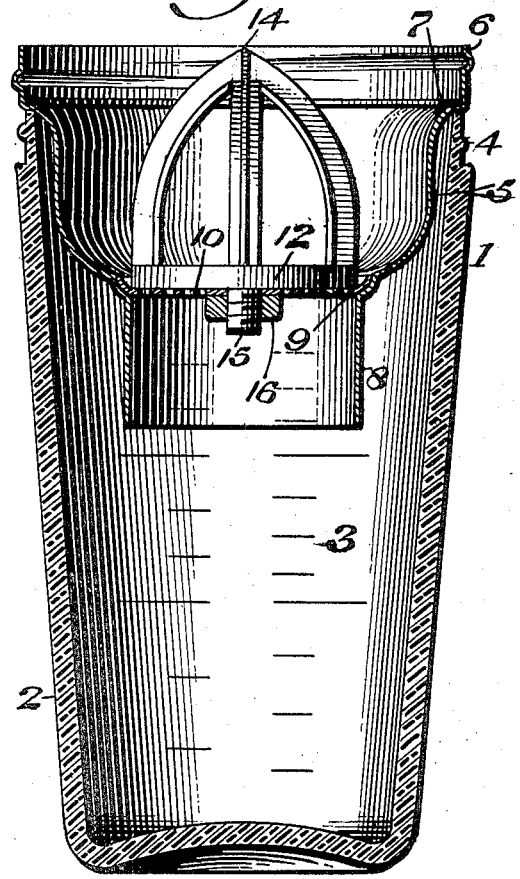
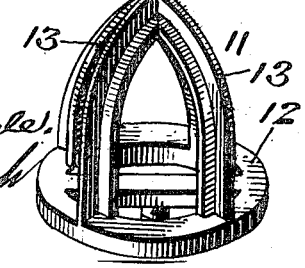
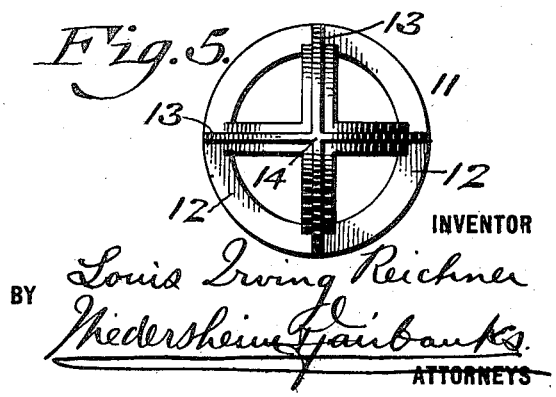

UNITED STATES PATENT OFFICE.

LOUIS IRVING REICHNER, OF ATLANTIC CITY, NEW JERSEY.

LIQUID MIXER, SHAKER, AND JUICE-EXTRACTOR.

1,075,119.   Specification of Letters Patent.   Patented Oct. 7, 1913.

Application filed May 31, 1913. Serial No. 770,871.

*To all whom it may concern:*

Be it known that I, LOUIS IRVING REICHNER, a citizen of the United States, residing at Atlantic City, in the county of Atlantic, State of New Jersey, have invented a new and useful Liquid Mixer, Shaker, and Juice-Extractor, of which the following is a specification.

My invention consists of a novel construction of a simple, efficient, attractive, clean and comparatively inexpensive mixer or shaker which is provided with reliable durable and effective means for extracting the juice of fruits, such as lemons, limes, oranges, and the like, and for separating the seeds and pulp therefrom, the juice extractor being secured within the top or cover of the implement so that by reversing said top the latter can be employed as a juice extractor and the juice allowed to run into the body or tumbler portion of the implement, the cover being thereafter reversed and assembled with respect to the body, whereby the vessel or implement can be tightly closed when it is desired to shake or agitate the contents, which latter can be readily shaken up, mixed and cooled without liability of leakage and the contents can then be strained without detachment of any part of the implement or the employment of a separate strainer.

It further consists in the employment of a novel body or tumbler portion of glass or the like, having thereon a gage or graduation or indicating device, whereby the quantity of the ingredients to be mixed can be readily proportioned and ascertained, said body having an upper threaded portion adapted to engage a similarly threaded portion of the top or cover of the implement.

It further consists of a novel construction of top or cover having therein a straining device, the latter having attached thereto a device for extracting the juice from lemons, limes, oranges, or other fruit, in such a manner as to exclude the oil and other objectionable matter contained within the rind, and also to exclude from the extracted juice the seeds and the indigestible fibers or pithy matter contained within the fruit.

To the above ends my invention consists of a novel construction of liquid mixer, shaker, and juice extractor, the novel features of which will be hereinafter fully set forth.

It further consists of other novel features of construction all as will be hereinafter fully set forth.

For the purpose of illustrating my invention, I have shown in the accompanying drawing one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a sectional view of a liquid mixer, shaker, and juice extractor, embodying my invention, showing the parts in assembled condition when in use as a shaker. Fig. 2 represents a sectional view showing the parts assembled in position to be used as a juice extractor and strainer. Fig. 3 represents a side elevation of the outer cap in detached position. Fig. 4 represents a top plan view of the juice extracting device in detached position. Fig. 5 represents a perspective view of the juice extractor in detached position.

Similar numerals of reference indicate corresponding parts in the figures.

Referring to the drawings:—1 designates my novel construction of mixer, shaker and juice extractor, the same comprising the lower body or tumbler portion 2 which, in the present instance, is preferably made of glass or similar transparent material, which is provided on its side with a series of scales or graduations 3, indicative of the proportions in which it is desired to combine the ingredients. The upper portion of the body 2 is exteriorly threaded, as indicated at 4, and is adapted to be in threaded engagement with the top or cover 5, which has a terminal flange 6 provided with internal threads adapted to engage the upper threaded portion 4 of the body 2.

7 designates a packing or washer secured to the cover 5 in any suitable manner, said washer being adapted to prevent leakage of the contents when the device is used as a shaker and being composed of any suitable material which will not affect the taste of the contents of the mixer.

The top or cover 5 is provided with an upwardly extending annular portion 8 within which is contained the strainer 9, the latter consisting of a plate provided with perforations 10, said plate being secured within the extension 8 by any suitable means as rolling, beading, soldering or the like.

11 designates the juice extracting device, the same comprising an annular base portion 12, provided with the projecting members 13 which are curved or of conical or similar shape, so as to meet at the apex 14, said projecting members or arms 13 being, in the present instance, four in number, and being T-shaped in cross section so as to readily extract the juice from the fruit and separate the seeds and pulp therefrom when the fruit is rotated on the arms 13. The base 12 is provided with a threaded stem 15 which projects through the strainer plate 9, whereby the juice extracting device is held in position by means of the nut 16.

17 designates a cap, which is adapted to engage or be mounted upon the extension 8, prior to agitating the contents of the mixer, said cap being provided with the knurled portion 18 for enabling the same to be readily manipulated or removed.

In practice, I make the juice extracting device 11 of metal or the like, the top or cover 5 and the cap 17 being also made of thin sheet metal, as aluminum, tin and the like, while the body portion 2 is preferably made of glass or other transparent material.

The operation is as follows:—In mixing lemonade or fancy drinks in which the juice of lemons, limes, oranges or other similar fruits are employed, the parts are first assembled as seen in Fig. 2, the cap 17 being removed. The fruit is rotated upon the juice extracting device 11 and the juice extracted therefrom flows through the straining plate into the body or tumbler of the implement. In case it is desired to mix with the fruit juice any of the liquors used in mixing fancy drinks, as cocktails or the like, the desired proportions of gin and vermuth, or vermuth and whisky or other ingredients can be readily ascertained from the scale or graduations 3, it being noticed that the scale on the right of Figs. 1 and 2 is divided into thirds and on the left of said figures into fourths, and the same having been poured into the body of the implement, the straining device is reversed from the position seen in Fig. 2 and secured to the top of the body portion 2 by a few turns of the cover 5. The cap 17 having been placed in position, the implement and its contents, such as the juice, liquors and ice, are shaken or agitated to the desired extent and upon the removal of the cap 17 can be readily strained into the glass or like receptacle. It will be apparent that the necessity of using a separate strainer or juice extractor is avoided and the utensil is easily kept clean and in a sanitary condition and the strainer and juice extractor being attached to or forming part of the cover on the shaker, there is no danger of misplacing or losing either, and the employment of the juice extractor in the position shown when the device is used as a shaker in addition facilitates a perfect mixing of the ingredients used.

If it is desired to employ the device for the purpose of quickly and thoroughly beating up and mixing an egg with lemonade, milk punch or other liquid shaken in the tumbler, it will be apparent that during the agitation of the contents of the utensil the cohesion of the egg and its stringiness are quickly and thoroughly overcome by being cut up on the edges of the arms 13 and a few shakes are sufficient to cut up and beat the egg thoroughly and mix it with lemonade, milk punch or other beverage thus making a perfectly smooth beverage, whereas by the ordinary method of mixing, the egg is rarely deprived of its ropiness, even by a good deal of shaking.

I desire to direct attention to the fact that by making the body portion 2 of glass or the like, the utensil can be always readily kept in a sanitary condition as it is well known that mixers which are made throughout of metal require to be kept scrupulously clean and that even when this is done, the tin or the like is soon eaten by the acid of the fruit juice, so as to expose the copper upon which the fruit juice acts to form verdigris. By my present invention I dispense with the metallic body portion and employ the body or tumbler portion of glass which will not be contaminated by the liquids being mixed and which will not be affected by the ingredients of the beverage, the device being capable of being readily and thoroughly cleaned as all the parts thereof can be readily reached.

It is apparent that the washer or packing device 7 may be dispensed with, if desired.

It will now be apparent that I have devised a novel and useful construction of a liquid mixer, shaker and juice extractor which embodies the features of advantage enumerated as desirable in the statement of the invention and the above description, and while I have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. A device of the character stated, comprising a tumbler or body-portion, a tapering top adapted to be detachably secured to the upper end of said body-portion and provided with a neck at its contracted end, a strainer in the inner end of such neck, and a tapering juice-extractor secured with its base against said strainer to project into said top.

2. A device of the character stated, comprising a tumbler or body-portion, a tapering top adapted to be detachably secured with its flaring end to the upper end of said body-portion and formed with a neck at its contracted end, a strainer secured in the inner end of said neck, and a tapering juice-extractor detachably secured with its open base to said strainer to project into said top and having convergingly curved arms T-shaped in cross-section.

3. A device of the character stated, comprising a tumbler or body-portion, a tapering top adapted to be detachably secured to the upper end of said body-portion and provided with a neck at its contracted end, a strainer in the inner end of such neck, a tapering juice-extractor secured with its base against said strainer to project into said top, and a cap adapted to detachably close said neck.

4. A device of the character stated, comprising a tumbler or body-portion, a tapering top adapted to be detachably secured with its flaring end to the upper end of said body-portion and formed with a neck at its contracted end, a strainer secured in the inner end of said neck, a tapering juice-extractor detachably secured with its open base to said strainer to project into said top and having convergingly curved arms T-shaped in cross-section, and a cap adapted to detachably close said neck.

5. A device of the character stated, comprising a tumbler or body-portion, a cover adapted to be detachably secured to the upper end of said body-portion and formed with a neck, a detachable cover for said neck, a strainer secured in the inner end of said neck, and an open and tapering juice-extractor secured in proximity to said strainer within said cover.

6. In a device of the character stated, the combination of a glass tumbler portion having a series of graduations, and a threaded upper portion thereon, a cover similarly threaded to engage the threaded portion of said body, a strainer plate within said cover, a juice extractor detachably secured to said strainer plate and projecting within said cover, said juice extractor comprising an annular base portion having a threaded stem projecting through said strainer plate, means for securing said stem to said strainer plate, and converging members attached to said base portion.

LOUIS IRVING REICHNER.

Witnesses:
C. D. McVay,
M. E. Byrne.